United States Patent [19]
Liu

[11] Patent Number: 5,623,634
[45] Date of Patent: Apr. 22, 1997

[54] RESOURCE ALLOCATION WITH PARAMETER COUNTER IN MULTIPLE REQUESTER SYSTEM

[75] Inventor: Jonathan Liu, Milpitas, Calif.

[73] Assignee: S3, Incorporated, Santa Clara, Calif.

[21] Appl. No.: 448,003

[22] Filed: May 23, 1995

Related U.S. Application Data

[63] Continuation of Ser. No. 946,274, Sep. 15, 1992, abandoned.

[51] Int. Cl.$^6$ .................................................. G06F 13/376
[52] U.S. Cl. ........................ 395/478; 395/474; 395/494; 395/496; 395/728; 395/731
[58] Field of Search ..................................... 395/433, 437, 395/474, 477, 478, 494, 495, 496, 728, 731

[56] References Cited

U.S. PATENT DOCUMENTS

| | | | |
|---|---|---|---|
| 4,422,070 | 12/1983 | Couper et al. | 340/723 |
| 4,558,429 | 12/1985 | Barlow et al. | 395/425 |
| 4,800,491 | 1/1989 | Hardy | 395/425 |
| 4,811,205 | 3/1989 | Normington et al. | 395/164 |
| 5,042,004 | 8/1991 | Agrawal et al. | 364/900 |
| 5,157,775 | 10/1992 | Sanger | 395/425 |
| 5,218,680 | 6/1993 | Farrell et al. | 395/325 |
| 5,249,279 | 9/1993 | Schmenk et al. | 395/425 |
| 5,301,278 | 4/1994 | Bowater et al. | 395/275 |

*Primary Examiner*—Reba I. Elmore
*Attorney, Agent, or Firm*—Skjerven, Morrill, MacPherson, Franklin & Friel; Norman R. Klivans

[57] ABSTRACT

A controller for a single port (typically FIFO) memory for a computer system allocates the flow of data from a single port dynamic RAM to several data requesters such as a graphics engine, a CPU, and a display screen. One parameter is assigned to the display screen and a second parameter is assigned to the other data requester. Then each memory cycle is assigned in duty cycle fashion to the data requesters associated with one or the other of the parameters. Thus, typically the screen display which requires large amounts of data will have a relatively large parameter value associated with it such as six, while the single parameter value associated with the graphic engine and CPU will have a lower value such as two. The screen display will in response access the memory for six memory cycles consecutively, while the graphics engine and CPU will access the memory for only two memory cycles. The FIFO associated with the screen display is thus kept relatively full so that the screen is refreshed at all times and no FIFO empty detection is thus needed. The memory controller includes a loadable counter for counting down the loaded parameter, and a state machine for loading in the values, decrementing the values held in the counter, and switching between the two parameters.

10 Claims, 17 Drawing Sheets

```
    begin
        wait until mclk = '1';
        micwrd <= mm63 ;
    end process ;
    end behavior ;
```

```
-- Behavioral Model of memory state machine
--
-- Created on 2-24-92
library synth;
use synth.stdsynth.dffc;
use synth.stdsynth.dffc_v;
use synth.stdsynth.dlatch;
--
-- Interface declaration:
--
entity MM is
-- Generic delays, with default values (in sim time units):
-- IO ports:
-- port (   signal mclk, mrstb, mirfqb, vvrqb, vbrqb, vcrqb, msmdnb, gmrqb,
                   gstwr, dmsz0, vstrd, vstwr, mstff, msmndb, vfrqb, mgpcb,
                   meq0, vfrqb0, vvrqb0, mentdnb, mrtdnb, vcurdi
                                                                 : in vlbit;
--
            signal mvga, mvgal, mmrqb, mprqb  :    inout   vlbit ;
            signal mrfrqb, micurd   :    out    vlbit;
            signal mdnb             :    inout  vlbit;
            signal mminc            :    out    vlbit;
            signal mstwr            :    inout  vlbit;
            signal mfinca, mvinca, mcinca  :    out   vlbit;
            signal maamx            :    out    vlbit_ld (1 downto 0) ;
            signal maddl            :    inout  vlbit;
            signal mifrd, mivrdlo, mivrdhi, mibrdlo, mibrdhi,
                   micrdlo, micrdhi :    out    vlbit;
            signal msubm, msubn  :    out    vlbit;
            signal mardy            :    inout  vlbit;
            signal mns              :    inout  vlbit_ld (3 downto 0) ;
--          signal mvrdy, mldm, mldn  :    out    vlbit;
end MM ;
--
-- Architecture body:
--
    architecture behavior of MM is
        signal mps    :   vlbit_ld (3 downto 0) ;
        signal mirfqbz, mstrd, mm4, mm5, mvnotrd, mvrd, mbdnbz, mrst, mstrdz,
               mgpcbz, mgendnb, mvrdyen, mgpcbin, vonec, mgsmdnb, mstwrz,
               qldn, qldm, mm6, msmdnbz, qsubn, qsubm, gstrd
                       :    vlbit;
        signal mm60, mm61, mm62, mm63   :   vlbit ;
--
        constant s0:   vlbit_ld ( 3 downto 0 )  := b"0000";
        constant s1:   vlbit_ld ( 3 downto 0 )  := b"0001";
        constant s2:   vlbit_ld ( 3 downto 0 )  := b"0010";
        constant s3:   vlbit_ld ( 3 downto 0 )  := b"0011";
        constant s4:   vlbit_ld ( 3 downto 0 )  := b"0100";
        constant s5:   vlbit_ld ( 3 downto 0 )  := b"0101";
        constant s6:   vlbit_ld ( 3 downto 0 )  := b"0110";
        constant s7:   vlbit_ld ( 3 downto 0 )  := b"0111";
        constant s8:   vlbit_ld ( 3 downto 0 )  := b"1000";
```

*FIG. 5a*

```
        constant s9:   vlbit_ld (3 downto 0) := b"1001";
        constant s10:  vlbit_ld (3 downto 0) := b"1010";
        constant s11:  vlbit_ld (3 downto 0) := b"1011";
        constant s12:  vlbit_ld (3 downto 0) := b"1100";
        constant s13:  vlbit_ld (3 downto 0) := b"1101";
        constant s14:  vlbit_ld (3 downto 0) := b"1110";
--      constant s15:  vlbit_ld (3 downto 0) := b"1111";
begin
------------------------------------------------------------
gstrd  <= not (gstwr) ;
mrst   <= not (mrstb) ;
vonec  <= not (dmsz0) ;
dffc_v (mns, mrst, mclk, mps) ;
dffc (mgpcbin, mrst, mclk, mgpcbz) ;
------------------------------------------------------------
   input: process
   begin
--         wait until mclk = '1' ;
           mirfqbz  <= mirfqb ;
           mstrdz   <= mstrd ; mstwrz <= mstwr ;
--         mvnotrd  <= msmdnb or not mstrdz or not mvgal or not mvrdyen ;
           mgendnb  <= mentdnb or mvgal ;
           mgsmdnb  <= mdnb and msmndb ;
--         mm4      <= msmdnb or not mstrdz or not mvgal or not mvrdyen ;
           mm5      <= mm4 ; mm6 <= mm5 ; mvrd <= mm6 ;
--         mardy    <= not (msmdnb or not mvgal or not mvrdyen) ;
--         mbdnbz   <= not mardy and msmndb ;
--         msmdnbz  <= msmdnb and msmndb ;
           msubn    <= qsubn ;
           msubm    <= qsubm ;
           mldn     <= qldn ;
--         mldm     <= qldm ;
       if mgpcbin = '1' then
           mdnb    <= not vlbit ((mmrqb='0' or mprqb='0') and mvga= '0') ;
       else
           mdnb    <= mentdnb or mvgal ;
       end if;
--     end process ;
------------------------------------------------------------
   iomux : process (mps, vonec, mgsmdnb, mvnotrd, mvrd, madd1, mgpcbz, mgendnb, gmrqb,
                    mmrqb, mstrdz, mvgal, mvrdyen, mgpcb, msmdnbz, msmdnb, mprqb)
       begin
--     use gmrqb to qualify latching
       if (mmrqb = '0' or mprqb= '0' ) and gmrqb = '0' then
           mgpcbin  <= mgpcb ;
       else
           mgpcbin  <= mgpcbz ;
--     end if;
       if vonec    = '0' then
           mvrdyen  <= vlbit (mps=b"0101") ;
```

FIG. 5b

```
            else
--              mvrdyen   <= vlbit (mps=b "0100") ;
            end if;
--          mvrdy     <= not (mvnotrd and mvrd) ;
        end process ;
------------------------------------------------------------
    output: process
    begin
--      wait until mclk = '1' ;
--          mvgal     <= mvga ;
--          maddl     <= mmrqb and mprqb ;
        end process ;
------------------------------------------------------------
    COMB : process (mrstb, vvrqb, mirfqbz, maddl, mrtdnb, mgsmdnb, vbrqb, mps, vonec, vstwr,
                    vstrd, gstwr, msmdnbz, mm5, mm4, mstrdz, mstwrz, mstff, vcrqb, meg0,
    BEGIN        gstrd, gmrqb, vfrqb, mns, mm61, mm63, vcurdi, mbdnbz, vfrqb0, vvrqb0)
------------------------------------------------------------
--          OUTPUT and NEXT STATE ASSIGNMENT
------------------------------------------------------------
--          mmrqb     <= '1' ; mprqb  <= '1' ;    mrfrqb <= '1' ;
            mstrd     <= '1' ; mstwr  <= '0' ;
            mvga      <= '1' ;
            maamx     <= b '00' ;
            qsubn     <= '0' ; qsubm  <= '0' ;
--          gldn      <= '0' ; qldm   <= '0' ;
--      CASE integer ( mps ) is
--    when    0  =>
                    if vfrqb= '0'  then
                        mmrqb <= '0' ;
                        gldn  <= '1' ;
                    if mstff= '1'  then
                        mns   <= s1 ;
                    else
                        mns   <= s3 ;
                    end if;
                    elsif vvrqb = '0'  then
                        mns   <= s9 ;
                        mmrqb <= '0' ;
                        gldn  <= '1' ;
                    elsif mirfqbz = '0' then
                        mns   <= s12 ;
                        mrfrqb <= '0' ;
                    elsif vcrqb   = '0' then
                        mns   <= s10
                        mmrqb <= '0' ;
                        maamx <= b"10";
                    elsif vbrqb   = '0' then
                        mns   <= s4 ;
                        mmrqb <= '0' ;
                        gldm  <= '1' ;
                        mstrd <=     vstrd ; mstwr  <= vstwr ;
                        maamx <=     b"01";
                    elsif gmrqb   = '0' then
```

FIG. 5c

```
                mmrqb    <=    '0' ;
                qldm     <=    '1' ;
                mstrd    <=    gstrd ;  mstwr   <=  gstwr ;
                mvga     <=    '0' ;
            else
                mns      <=    s0 ;
            end if;
--    when 7  =>
            if msmdnbz  =    '1'  then
                mns      <=    s7 ;
            elsif (vfrqb0  =   '0' ) then
                mns      <=    s3 ;
                mmrqb    <=    '0' ;
                qsubn    <=    '1' ;
            elsif mirfqbz  =    '0'  then
                mns      <=    s12 ;
                mrfrqb   <=    '0' ;
            elsif vcrqb  =    '0'  then
                mns      <=    s10 ;
                mmrqb    <=    '0' ;
                maamx    <=    b"10";
            elsif vbrqb  =    '0'  then
                mns      <=    s4 ;
                mmrqb    <=    '0' ;
                qldm     <=    '1' ;
                mstrd    <=    vstrd ; mstwr    <=  vstwr ;
                maamx    <=    b"01";
            elsif gmrqb  =    '0'  then
                mns      <=    s8 ;
                mmrqb    <=    '0' ;
                qldm     <=    '1' ;
                mstrd    <=    gstrd ; mstwr    <=  gstwr ;
                mvga     <=    '0' ;
            else
                mns      <=    s0 ;
            end if;
--    when 9  =>
            if msmdnbz  =    '1'  then
                mns      <=    s9 ;
            elsif vonec  =    '0'  then
                mns      <=    s11 ;
                mmrqb    <=    '0' ; then
            elsif vvrqb0  =    '0'  then
                mns      <=    s9 ;
                mmrqb    <=    '0' ;
                qsubn    <=    '1' ;
            elsif mirfqbz  =    '0'  then
                mns      <=    s12 ;
                mrfrqb   <=    '0' ;
            elsif vcrqb  =    '0'  then
                mns      <=    s10 ;
                mmrqb    <=    '0' ;
                maamx    <=    b"10" ; then
            elsif vbrqb  =    '0'  then
                mns      <=    s4 ;
                mmrqb    <=    '0' ;
                qldm     <=    '1' ;
                mstrd    <=    vstrd ; mstwr   <=   vstwr ;
                maamx    <=    b"01";
            elsif gmrqb  =    '0'  then
                mns      <=    s8 ;
                mmrqb    <=    '0' ;
```

FIG. 5e

```
                    qldm    <=  '1' ;
                    mstrd   <=  gstrd ; mstwr  <= gstwr ;
                    mvga    <=  '0' ;
            else
                    mns     <=  s0 ;
            end if;
-- when 11  =>
            if msmdnbz =     '1' then
                    mns     <=  s11 ;
            elsif vvrqb0 =  '0' then
                    mns     <=  s9 ;
                    mmrqb   <= '0' ;
                    qsubn   <= '1' ;
            elsif mirfqbz = '0' then
                    mns     <=  s12 ;
                    mrfrqb  <= '0' ;
            elsif (vcrqb  =  '0'  ) then
                    mns     <=  s10 ;
                    mmrqb   <= '0' ;
                    maamx   <= b"10";
            elsif vbrqb   =  '0' then
                    mns     <=  s4 ;
                    mmrqb   <= '0' ;
                    qldm    <= '1' ;
                    mstrd   <=  vstrd ; mstwr  <= gstwr ;
                    maamx   <= b"01";
            elsif gmrqb   =  '0' then
                    mns     <=  s8 ;
                    mmrqb   <= '0' ;
                    gldm    <= '1' ;
                    mstrd   <=  gstrd ; mstwr  <= vstwr ;
                    mvga    <= '0' ;
            else
                    mns     <=  s0 ;
            end if;
-- when 12  =>
            if mrtdnb =     '1' then
                    mns     <=  s12 ;
                    mrfrqb  <= '0' ; then
            else
                    mns     <=  s0 ;
            end if;
-- when 10  =>
            if msmdnbz =     '1' then
                    mns     <=  s10 ;
                    maamx   <= b"10"; then
            elsif vonec   =  '0' then
                    mns     <=  s14 ;
                    mmrqb   <= '0' ;
                    maamx   <= b"10"; then
            elsif vcrqb   =  '0' then
                    mns     <=  s10 ;
                    mmrqb   <= '0' ;
                    maamx   <= b"10";
            else
                    mns     <=  s0 ;
            end if;
-- when 14  =>
```

FIG. 5f

```
         if msmdnbz   =   '1' then
               mns    <=  s14 ;
               maamx  <=  b"10";
         elsif vcrqb  =   '0' then
               mns    <=  s10 ;
               mmrqb  <=  '0' ;
               maamx  <=  b"10";
         else
               mns    <=  s0 ;
         end if;
-- when 4   =>
         if vonec='1' then
            if mbdnbz   =    '1' then
               mns    <=  s4 ;
               mstrd  <=  vstrd ; mstwr  <=  vstwr ;
               maamx  <=  b"01";
            elsif vbrqb  =   '0' and meq0 = '0' then
               mns    <=  s4 ;
               mstrd  <=  vstrd ; mstwr  <=  vstwr ;
               maamx  <=  b"01";
               qsubm  <=  '1' ;
               mprqb  <=  '0' ;
            elsif vfrqb  =   '0'     then
               mmrqb  <=  '0' ;
               qldn   <=  '1' ;
               if mstff  =   '1'     then
                  mns    <=  s1 ;
               else
                  mns    <=  s3 ;
               end if;
            elsif vvrqb  =   '0'     then
               mns    <=  s9 ;
               mmrqb  <=  '0' ;
               qldn   <=  '1' ;
            elsif mirfqbz  =   '0'   then
               mns    <=  s12 ;
               mrfqb  <=  '0' ;
            elsif vcrqb  =   '0'     then
               mns    <=  s10 ;
               mmrqb  <=  '0' ;
               maamx  <=  b"10";
            elsif vbrqb  =   '0' then
               mns    <=  s4 ;
               mmrqb  <=  '0' ;
               qldm   <=  '1' ;
               mstrd  <=  vstrd ; mstwr  <=  vstwr ;
               maamx  <=  b"01";
            else
               mns    <=  s0 ;
            end if;
         else
            if msmdnbz   =   '0' then
               mns    <=  s5 ;
               mmrqb  <=  '0' ;
               mstrd  <=  vstrd ; mstwr  <=  vstwr ;
               maamx  <=  b"01";
            else
               mns    <=  s4 ;
               mstrd  <=  vstrd ; mstwr  <=  vstwr ;
               maamx  <=  b"01";
            end if;
         end if;
-- when 5   =>
```

*FIG. 5g*

```
--
     if mbdnbz     =    '1' then
          mns      <=   s5 ;
          mstrd    <=   vstrd ; mstwr  <= vstwr ;
          maamx    <=   b"01";
     elsif vbrqb   =    '0' and meq0 = '0' then
          mns      <=   s4 ;
          mstrd    <=   vstrd ; mstwr  <= vstwr ;
          maamx    <=   b"01";
          qsubm    <=   '1' ;
          mprqb    <=   '0' ;
     elsif vfrqb   =    '0' then
          mmrqb    <=   '0' ;
          qldn     <=   '1' ;
          if mstff =    '1'    then
               mns <=   s1 ;
          else
               mns <=   s3 ;
          end if;
     elsif vvrqb   =    '0'    then
          mns      <=   s9 ;
          mmrqb    <=   '0' ;
          qldn     <=   '1' ;
     elsif mirfqbz =    '0'    then
          mns      <=   s12 ;
          mrfrqb   <=   '0' ;
     elsif vcrqb   =    '0'    then
          mns      <=   s10 ;
          mmrqb    <=   '0' ;
          maamx    <=   b"10";
     elsif vbrqb   =    '0' then
          mns      <=   s4 ;
          mmrqb    <=   '0' ;
          qldm     <=   '1' ;
          mstrd    <=   vstrd ; mstwr  <= vstwr ;
          maamx    <=   b"01";
     else
          mns      <=   s0 ;
     end if;
--  when 8     =>
     if mgsmdnb    =    '1' then
          mns      <=   s8 ;
          mstrd    <=   gstrd ; mstwr  <= gstwr ;
          mvga     <=   '0' ;
     elsif gmrqb   =    '0' and meq0 = '0' then
          mns      <=   s8 ;
          mstrd    <=   gstrd ; mstwr  <= gstwr ;
          mvga     <=   '0' ;
          qsubm    <=   '1' ;
          mprqb    <=   '0' ;
     elsif vfrqb   =    '0' then
          mmrqb    <=   '0' ;
          qldn     <=   '1' ;
          if mstff <=   '1' then
               mns <=   s1 ;
          else
               mns <=   s3 ;
          end if;
     elsif vvrqb   =    '0' then
          mns      <=   s9 ;
          mmrqb    <=   '0' ;
          qldn     <=   '1' ;
     elsif mirfqbz =    '0' then
          mns      <=   s12 ;
```

FIG. 5h

```
--          mrfrqb    <=  '0' ;
       elsif vcrqb     =   '0' then
              mns      <=  s10 ;
              mmrqb    <=  '0' ;
              maamx    <=  b"10";
       elsif vbrqb     =   '0' then
              mns      <=  s4 ;
              mmrqb    <=  '0' ;
              qldm     <=  '1' ;
              mstrd    <=  vstrd ; mstwr  <= vstwr ;
              maamx    <=  b"01";
       elsif gmrqb     =   '0' then
              mns      <=  s8 ;
              mmrqb    <=  '0' ;
              qldm     <=  '1' ;
              mstrd    <=  gstrd ; mstwr  <= vstwr ;
              mvga     <=  '0' ;
       else
              mns      <=  s0 ;
       end if;
-- when others =>
--            mns      <=  s0 ;
  END CASE;
--            mminc    <=  vlbit ( mns = s2 or(mps
--                                           or
--            mfinca   <=  not (maddl and vlbit  (mps = s3) ;
       if vonec        =   '0' then
              mvinca   <=  not (maddl) and vlbit  (mps = s2 or mps = s7 or mps = s11) ;
              mcinca   <=  not (maddl) and vlbit  (mps = s14) ;
       else
              mvinca   <=  not (maddl) and vlbit  (mps = s1 or mps = s3 or mps = s9) ;
              mcinca   <=  not (maddl) and vlbit  (mps = s10) ;
       end if;
--
              mifrd    <=  vlbit (mps = s3 ) ;
              micrdlo  <=  vlbit (mps = s10 ) ;
              micrdhi  <=  vlbit (mps = s14 ) ;
              mivrdlo  <=  vlbit (mps = s1 or mps = s7 or mps = s9 );
              mivrdhi  <=  vlbit (mps = s2 or mps = s7 or mps = s11);
              mibrdlo  <=  vlbit (mps = s4 and mstwrz = '0' ) ;
              mibrdhi  <=  vlbit (mps = s5 and mstwrz = '0' ) ;
       if maddl        =   '0' and ( mps = s1 or mps = s3 ) then
              mm60     <=  vcurdi ;
       else
              mm60     <=  mm61 ;
       end if;
--     if msmdnbz      =   '0' then
              mm62     <=  mm61 ;
       else
              mm62     <=  mm63 ;
--     end if;
end process;
dffc (mm60 , mrst , mclk , mm61) ;
dffc (mm62 , mrst , mclk , mm63) ;
hilo : process
```

*FIG. 5i*

```
--  Behavioral Model of counter
--
--  Created on 2-25-92
        library synth;
        use synth.stdsynth.dff;
        use synth.stdsynth.dff_v;
        use synth.stdsynth.dlatch;
        use synth.stdsynth.dlatch_v;

--  Interface declaration:

entity MC is
--  Generic delays, with default values (in sim time units) :
--  IO ports:

port (signal  mclk, mrstb, msubm, msubn, mldm, mldn,
                      mpgchgb, valpha, dsp8514
                                                  :  in vlbit;
                signal  mregn         :  in vlbit_ld ( 7 downto  0) ;
                signal  mregm         :  in vlbit_ld ( 4 downto  0) ;

signal  moutz         :  inout vlbit_ld ( 7 downto  0);
                signal  malpha, mbrwz :  inout vlbit ) ;

end MC ;
--  Architecture body:

architecture behavior of MC is
        signal   mcnt  :  vlbit_ld ( 7 downto 0);
        signal   mbrw
                               :  vlbit;
        signal   mcin          :  vlbit_ld ( 8 downto 0) ;
        signal   mcn, mmregn   :  vlbit_ld ( 7 downto 0) ;
--      signal   mcm, mmregm   :  vlbit_ld ( 4 downto 0) ;
begin
        iomux : process (mpgchgb, msubm, msubn, mldm, mldn, moutz, mbrwz, malpha,
begin                    mmregm, mmregn, valpha, mcin, mrstb, dsp8514 )
--          if mrstb     =    '0' then
                  mcin  <=   '0' and mmregn ;
        elsif ( msubm  =    '1' and mpgchgb='1')  or msubn = '1' then
                  mcin  <=   subm ( moutz , b"1" ) ;
        elsif  msubm   =    '1' and mpgchgb='0' then
                  mcin  <=   subm ( moutz , b"11" ) ;
        elsif  mldm    =    '1' then
                  mcin  <=   b"0000" and mmregm ;
        elsif  mldn    =    '1' then
         else     mcin  <=   '0' and mmregn ;
                  mcin  <=   mbrwz and moutz ;
        . end if;
                  mcnt  <=   mcin ( 7 downto 0) ;
                  mbrw  <=   mcin (8) ;
```

FIG. 5k

```
--          if ffull    = '1' or vinhb = '0' then
--              mcrq    <=  '0' ;
--          else
--              mcrq    <=  '1' ;
--          end if;
--      output signals
--              malpha  <=  valpha and not dsp8514;
--              vfrqb   <=  not (malpha and mcrq) ;
--              vfrqb0  <=  not (malpha and mcrq and not meq0 ) ;
--              vvrqb   <=  not (not malpha and mcrq) ;
--              vvrqb0  <=  not (not malpha and mcrq and not meq0 ) ;
--
end process ;
-----------------------------------------------
fdbk : process
--
begin
--  wait until  mclk    =  '1' ;
--
            moutz   <=  mcnt ;
            mbrwz   <=  mbrw ;
--
            mcm     <=  mregm ; mcn <= mregn ;
            mmregm  <=  mcm ; mmregn <= mcn ;
--
    end process;
-----------------------------------------------
--          meq0    <=  vlbit (mbrwz = '1' or moutz = b"00000000" ) ;
--
--          mlt3    <=  vlbit ( vinhb = '1' and
--                      (mbrwz = '1' or moutz = x"02" or
--                       moutz = x"01" or moutz = x"00" )) ;
-----------------------------------------------
    end behavior;
```

*FIG. 5l*

RESOURCE ALLOCATION WITH PARAMETER COUNTER IN MULTIPLE REQUESTER SYSTEM

This application is a continuation of application Ser. No. 07/946,274, filed Sep. 15, 1992 now abandoned.

BACKGROUND OF THE INVENTION

1. Field of the Invention

This invention relates to control of a single port memory in a computer system. More specifically, the invention relates to controlling flow of information from a single port dynamic random access memory in the computer system to other portions of the computer system such as the display, the CPU, and graphics engine by using parameters to control the duty cycle by which the graphics engine, CPU and display share access to the memory.

2. Description of the Prior Art

Graphics systems for computers include random access graphics display memory (RAM) which is accessed by both the display, the central processing unit (CPU), and the graphics engine (graphics processor). Typically, this memory is dual ported video RAM with one serial port dedicated to the display and one parallel port accessed by the graphics engine and the CPU. However, such video RAM is relatively expensive and it would be more cost effective to use a single port DRAM (dynamic random access memory) memory. The display needs to receive a large amount of data from the memory in order to keep the display refreshed, where the typical bandwidth of data transfer from the memory to the display is 25 to 80 Megabytes per second. The graphics engine (GE) and central processing unit each typically operate at different speeds, at typically one megabyte per second to about 90 megabytes per second. The display is usually given the highest priority for memory access because its screen must be kept continually updated. This is usually accomplished by providing a first in first out (FIFO) memory interposed between the display memory and the display. The FIFO functions as a data "reservoir" and is kept relatively full, so that the display is continually provided with data.

The problem then given the single ported DRAM is making sure that the FIFO is not emptied, and if it is emptied (or nearly so) to ensure that data is immediately provided from display memory and hence to the display; this typically is done by detecting whether the FIFO is full or nearly empty. When the FIFO is full, data is no longer transferred to it from the display memory. When the FIFO is nearly empty, data must be transferred to it immediately. It is difficult to detect exactly when the FIFO is full or empty due to asynchronous clocks of the memory access and display access. To accommodate this uncertainty, a larger size FIFO is needed to avoid FIFO overflow and underflow.

Thus detection of the FIFO being full or empty is relatively difficult and in most systems the FIFO is made relatively large to account for the uncertainty of detection of full and empty. Moreover in the typical prior art system the FIFO pointers pointing to the FIFO read location and write location are compared to determine whether the FIFO is empty or full, and when they are approximately together i.e. within some limit between the read pointer and the write pointer, the FIFO is assumed to be nearly empty. Given the asynchronicity between the display and the graphics engine and CPU and the fact that the display is reading in data at a variety of speeds typically between 25 and 80 MHz, there is further uncertainty which complicates the design and requires a relatively larger FIFO, at additional expense.

Thus there is a need to solve the general problem of data being delivered from the single ported memory at a fixed rate and being distributed between different requesters such as the display, graphics engine and CPU which are asynchronous and typically accepting the data at different rates and also achieves the best possible performance. In other words, there is a need for a relatively simple and reliable scheme to allocate data to the memory requesters.

SUMMARY OF THE INVENTION

In accordance with the invention, the above described problem of data allocation for a single ported memory is solved using an arbitration scheme which establishes two parameters, one designated M associated with the graphics engine and CPU, and a second designated N associated with the display. The memory cycle is a fixed duration of the memory clock, and n memory cycles of memory operation in sequence are devoted to sending data to the display (i.e. screen refresh) and the following m clock cycles of memory operation in sequence are devoted to sending data to the graphics engine and/or CPU. Thus, the length of the memory access cycles is fixed and a certain number of memory cycles are used in a duty cycle pattern to allocate the data between the memory requesters.

Thus there advantageously is no need to detect memory empty, and it is possible programmably to optimize the values of m and n for different computer system configurations. It has been found that by optimizing values of m and n for a particular system, performance as measured by the industry standard Winmark may be improved about 20%. The values of m and n maybe fixed for a particular system configuration but are programmable in order to make the circuitry which embodies the above described scheme usable with different types of systems. The condition of the FIFO memory being full is determined by comparing the read pointer and write pointer of FIFO. There will be uncertainty associated with this comparison because the read pointer is based on the display clock and the write pointer is based on the memory clock.

This duty cycle scheme for memory resource allotment achieves optimum performance across a wide range of system configurations. In addition, it accomodates the situation that with the typical IBM PC bus (ISA and EISA standard bus), one may hold the bus for access to the CPU for a maximum of 2.5 microseconds. In accordance with the invention one overcomes this by setting the values of m and n to conform to this 2.5 microsecond maximum CPU bus occupation.

In addition, a state machine detects whether the FIFO memory which supplies data to the display is full. When FIFO is full, i.e. about to overflow, this is detected and immediately the data flow is switched to the graphics engine and/or CPU away from the FIFO. Thus the FIFO condition of being full is monitored at every memory clock cycle and when FIFO is detected as full, data is not sent into FIFO and instead control is switched to the m (CPU/GE) parameter. However, FIFO empty does not need to be detected because a larger N and/or smaller M can always guarantee that the FIFO never becomes empty.

Advantageously the above described scheme allows use of a relatively smaller FIFO than in the prior art and also optimally distributes the data from memory to the data requesters in the system. Also, in the future when technology improves and the data rate coming from memory increases, no hardware redesign is necessary. Instead, by changing the values of n and m the same circuit can be used.

Some known graphics controllers incorporate fixed numbers of cycles for data allocation to display and CPU/GE. However, they are not programmable as disclosed here. Therefore, better performance across different computer platforms is advantageously achieved in accordance with this invention.

In another embodiment, rather than only having two parameters m and n, one for the display and the other for the other data requesters, it is possible to establish three or more parameters, one for each data requester or group of data requesters.

Also in accordance with the invention, in the memory access, there are two kinds of cycles that have different access times. If the address is in the same row in the DRAM (conventionally arranged in rows and columns), access time is typically only 40 to 50 nsec (which is two memory clocks in one example). If the address is not in the same row in the DRAM, access time is around 130 nsec (which is six memory clocks in one example). The memory state machine and loadable counter will take this into consideration when they initiate a memory request. If a CPU/GE access address is in a different row from a previous access, the state machine will not initiate the memory cycle if the current "m" value is less than 3 (6÷2). Therefore, the meaning of m herein is defined in one embodiment as the "number of page cycles allowed". More generally, any programmable n, m may be used.

The system in accordance with the invention is applicable to any asynchronous computer system or a computer system that has multiple data requesters operating at different rates and reading out from one memory or other data source.

BRIEF DESCRIPTION OF THE DRAWINGS

FIG. 2 shows a block diagram of a FIFO memory controller in accordance with the present invention.

FIGS. 5a and 5b show a simulation of the counter of FIG. 2.

FIGS. 5c through 5l show a simulation of the memory state machine of FIG. 2.

DETAILED DESCRIPTION OF THE INVENTION

Figure 1:
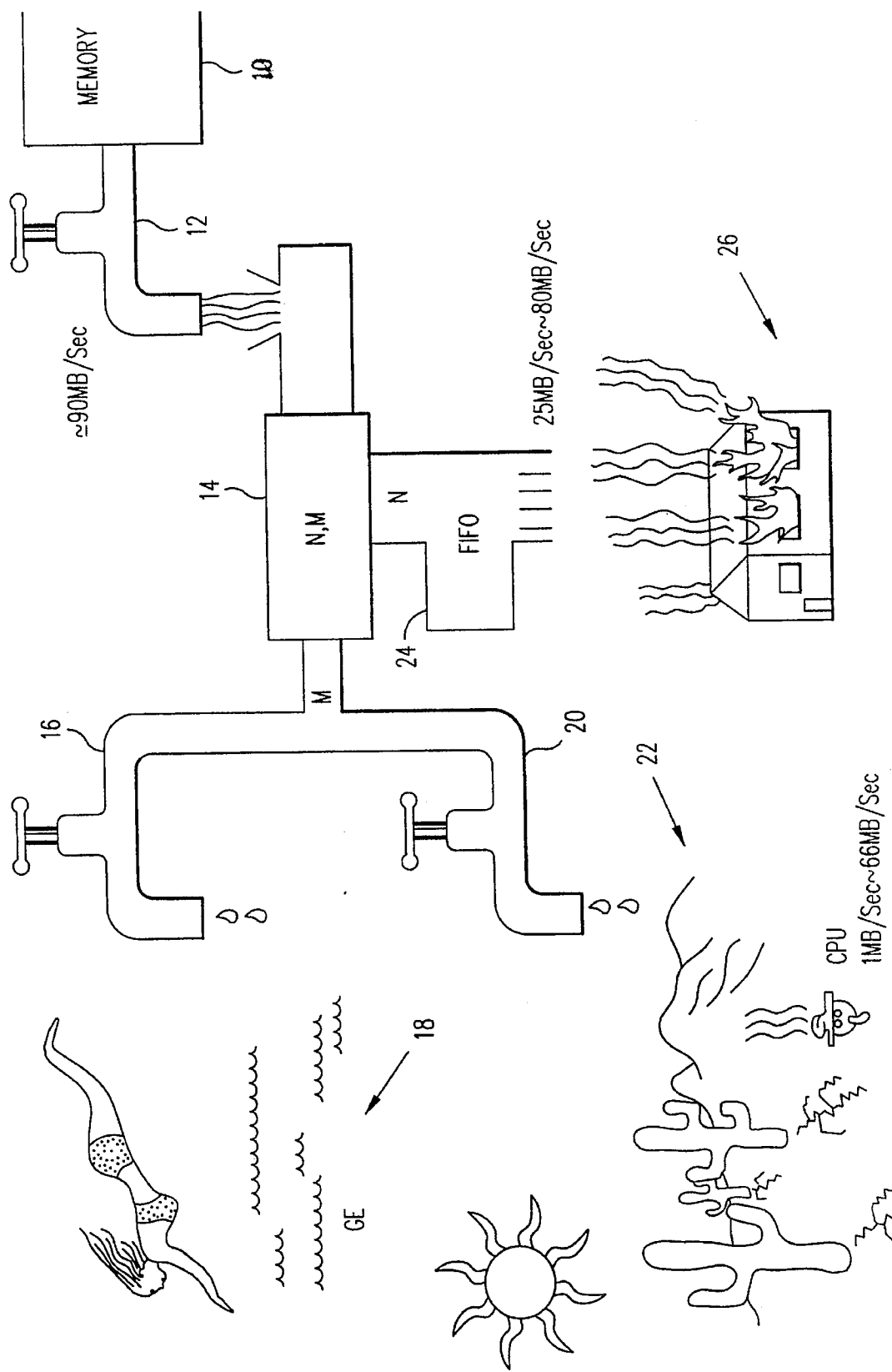
FIG. 1 shows a pictorialized version of a computer system in accordance with the present invention.

FIG. 1 shows a pictorialized version of a computer graphics system in accordance with the invention. DRAM memory 10 is a single port graphics display memory with the single port 12 delivering data (shown here metaphorically as water) at approximately 90 megabytes per second. This data is sent to the FIFO controller 14 which includes the parameters N and M, with N being associated with the computer display (monitor) 26 and M being associated with both the CPU 22 and the graphics engine (GE) 18. The FIFO controller 14 during the consecutive M cycles (M being an integer) delivers the data to port 16 which is associated with the graphics engine 18 which is one requester of data (here depicted as a swimming pool) and to the other associated port 20 for delivering data to the CPU 22, which is depicted as a desert, i.e. needing relatively little water. Typically the CPU accepts data at rates of one megabyte per second to about 65 megabytes per second. The graphics engine needs as much data as possible for higher performance. In one embodiment, CPU access is given higher priority than the GE.

Also shown is the FIFO 24 (shown here a reservoir for water) for temporarily storing data as delivered by the FIFO controller 14 in order to maintain a constant supply of data (water) to the high demand display 26, here depicted as a house on fire, i.e needing large amounts of water. The display 26 typically requests data at 25 to 80 megabytes per second. The FIFO reservoir 24 receives data via the controller 14 during N consecutive number memory cycles. Typically therefore N is a larger number than M in this illustration so that the FIFO "reservoir" 24 receives considerably more of the resource (data) than does graphics engine 18 or CPU 22. This is true when the display needs 80 MB/sec. of data. When the display needs only 25 MB/sec, then M is much larger than N.

Figures 2, 5J:
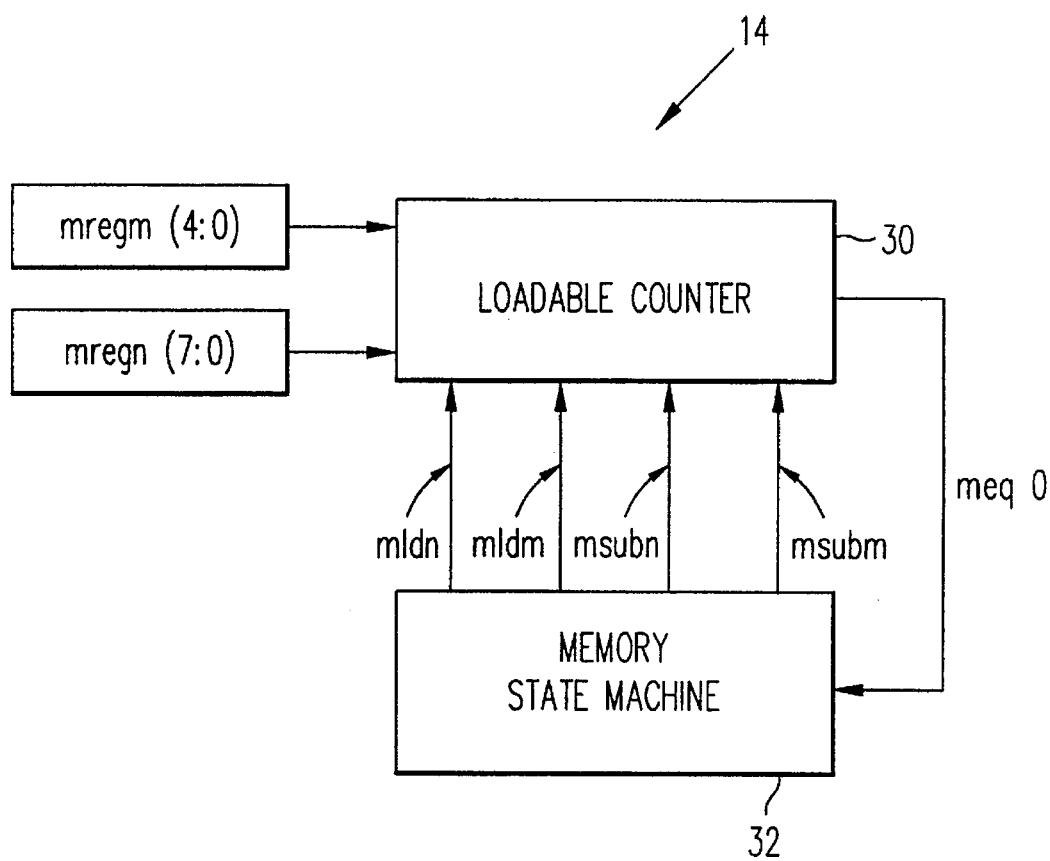

The FIFO controller 14 is depicted in FIG. 2 in a high level block diagram. FIFO controller 14 includes loadable counter 30 which is loadable with a five bit value from a register designated mregm and also alternatively loadable with an 8 bit value from a register designated mregn. (The values m, n here correspond to M, N in FIG. 1.) This loading takes place under control of memory state machine 32. The m value is loaded from mregm in response to the load m signal designated mldm. The n register value is loaded from mregn in response to the n load signal designated mldn.

Both register m and register n are programmable. Thus, load n (mldn) and load m (mldm) are control (command) signals to load the respective register values in the counter. Also provided from memory state machine 32 to loadable counter 30 are the signals msubn and msubn, both of which tell the counter 30 to subtract a value from the value in the counter. Typically the amount subtracted is one. Thus memory state machine 32 has the ability to load particular values into the counter 30 and to decrement the value held in the counter 30. The feedback signal meq0 (also designated below as "moutz") is a feedback signal from the loadable counter 30 to the memory state machine 32 indicating that the value currently held in the counter 30 is equal to zero, i.e. that the original m or n value has been decremented to zero under control of the memory state machine. Thus the meq0 signal tells the state machine to go to a new state, i.e. load the other of the parameters.

Table A shows as an example n, m values for 386/486 microprocessor-based computer systems using a 45 MHz memory clock for various system configurations in terms of amount of graphics memory ("MEMORY") in megabytes, display mode ("MODE"), and display clock speed in MHz ("DCLK"). "N.E.B." in Table A means not enough bandwidth to support the particular configuration.

TABLE A

| n, m VALUES FOR 386/486 USING 45 MHz MEMORY CLOCK | | | | |
|---|---|---|---|---|
| MEMORY | MODE | DCLK | N | M |
| 1.2 MEG | VGA TEXT | 28 | 7 | 15 |
| 1.2 MEG | VGA GRPH. | 25 | 7 | 15 |
| 1.2 MEG | 132 COL. TX | 40 | 7 | 7 |

TABLE A-continued n, m VALUES FOR 386/486 USING 45 MHz MEMORY CLOCK

| MEMORY | MODE | DCLK | N | M |
| --- | --- | --- | --- | --- |
| 1.2 MEG | 1024 × 768 × 8 | 76 | 31 | 1 |
| 1.2 MEG | 640 × 480 × 24 | 90 | N.E.B. | N.E.B. |
| 1.2 MEG | 640 × 480 × 24 | 80 | 47 | 0 |
| 1.2 MEG | 1280 × 1024 × 4 | 110 | 15 | 3 |
| 0.5 MEG | VGA TEXT | 28 | 7 | 7 |
| 0.5 MEG | VGA GRPH. | 25 | 7 | 7 |
| 0.5 MEG | 132 COL. TX. | 40 | 15 | 1 |
| 0.5 MEG | 1024 × 768 × 4 | 76 | 23 | 1 |

Figures 3, 3A:
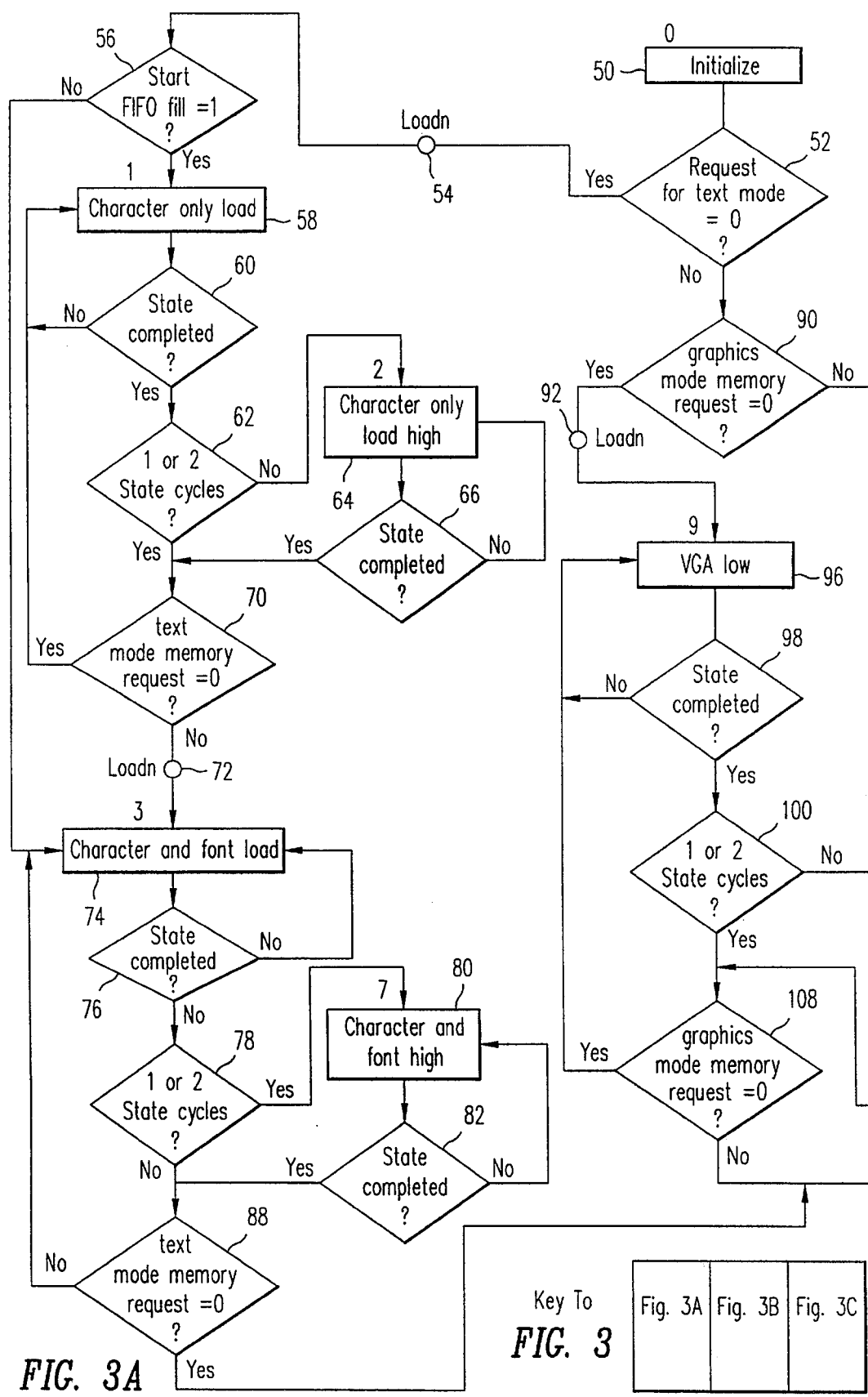
FIGS. 3A, 3B, 3C show a state-diagram as in the memory controller of FIG. 2; together these are referred to as "FIG. 3" below.
Figure 3B:
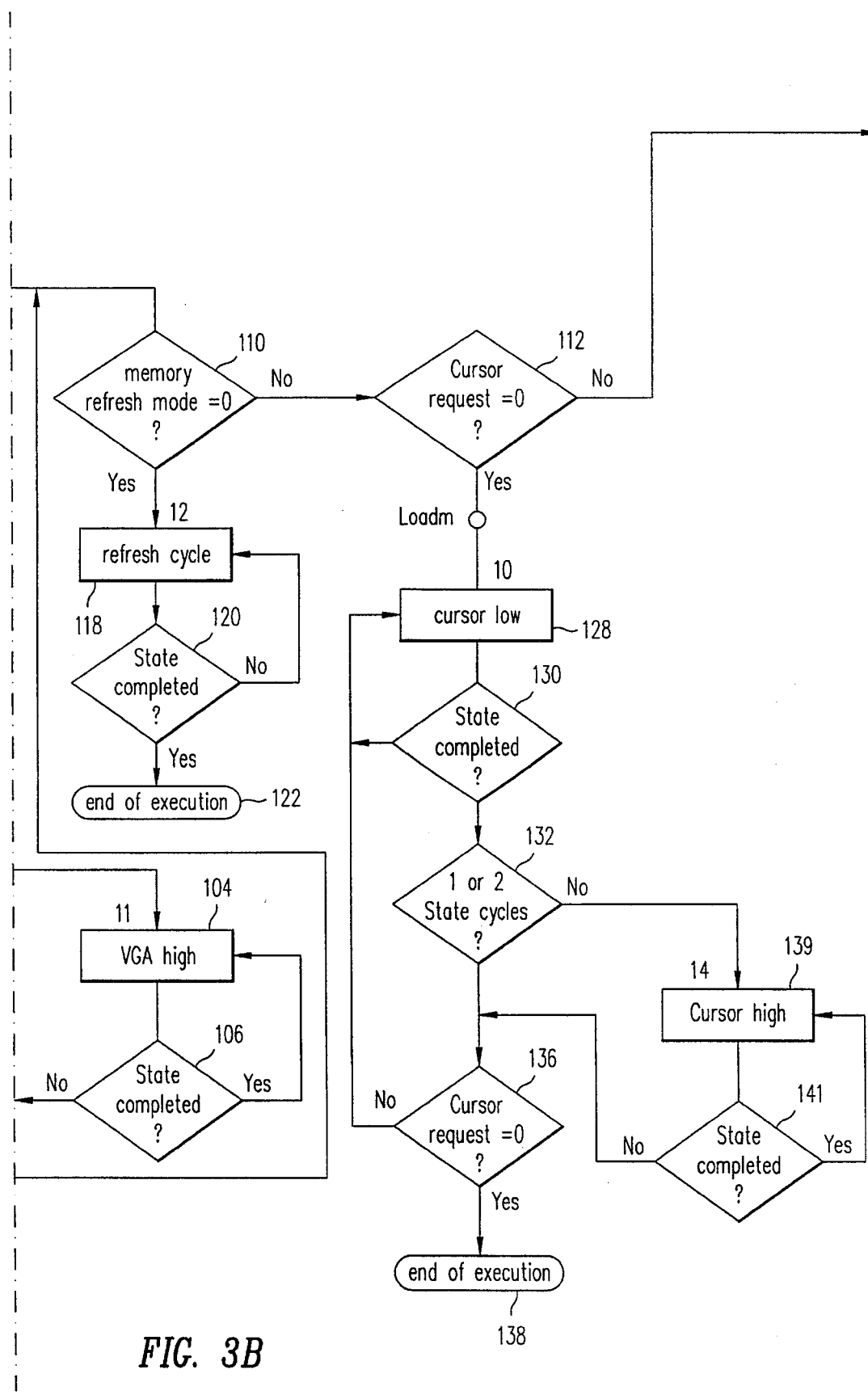
Figure 3C:
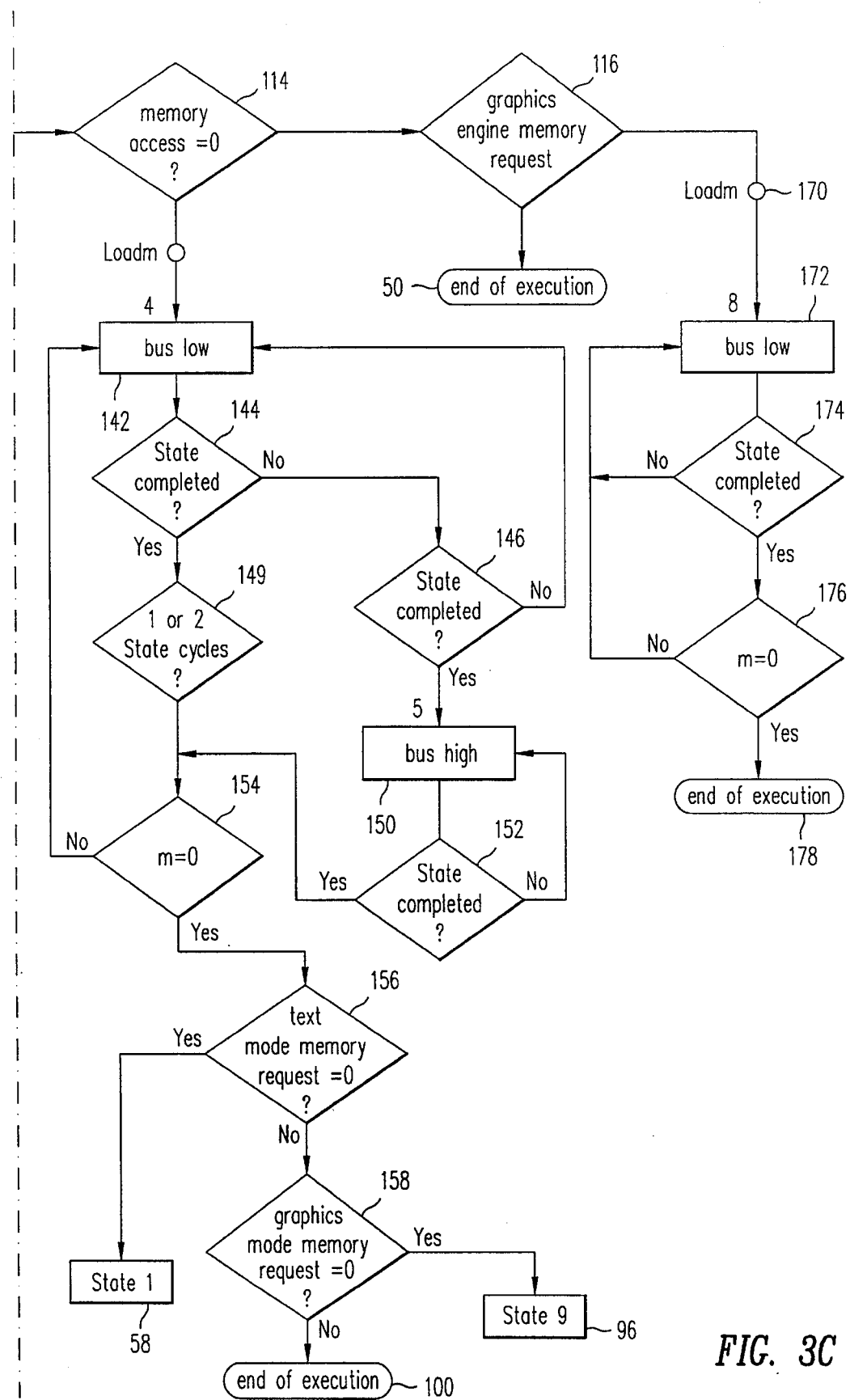

FIG. 3 (including FIGS. 3A, 3B and 3C) is a state diagram showing the operation of memory state machine 32 of FIG. 2. In FIG. 3 the large rectangles are the states with the associated state number indicated by an integer on the top of the rectangle, i.e. the integers 0 through 14. The diamonds are conventionally decision blocks with one path being yes ('Y') and the other path being no (N). The small circles are indicated actions, typically load m or load n which are designated as qldm and qldn respectively.

The state machine operates by going through the various states following the paths in accordance with the various decision points, in order to control operation of the loadable counter. The significance of each of the states is shown in Table B. (Note that there is no state 6 or state 13.)

TABLE B

State Machine

| State # | FIG. 3 designation | meaning |
| --- | --- | --- |
| S0 | I | initialize |
| S1 | COL | character only load |
| S2 | COH | character only load high |
| S3 | CFL | character and font load |
| S4 | BL | CPU bus (request) low |
| S5 | BH | CPU bus (request) high |
| S6 | (none) | — |
| S7 | CFH | character and font high |
| S8 | GO | graphics engine 0 |
| S9 | VL | VGA LOW |
| S10 | CL | cursor low |
| S11 | VH | VGA high |
| S12 | RF | refresh cycle |
| S13 | (none) | — |
| S14 | CH | cursor high |

Additional elements that occur repeatedly in FIG. 3 are msmdnb, meaning that the particular state is done (complete) or not, and the zero symbol indicating the end of execution of the state sequence. Also shown repeatedly are vbrqb indicating a CPU bus cycle memory request, vfrqb indicating a text mode memory request, and vvrqbq indicating a graphics mode memory request. An additional element is vonec indicating whether or not there are 1 or 2 state cycles per memory cycle indicator.

Beginning with state zero which is the initialization state at block 50 in FIG. 3, the first decision point at block 52 is whether the value vfrqb is equal to zero. Value vfrqb refers to whether there has been a request for the text mode to be fetched from memory. If yes, the branch goes to the command qldn at step 54 which means load n (mldn) as shown in FIG. 2. Then one enters the decision block 56 in which it is determined whether the value of variable STFF equals one. STFF refers to start FIFO fill. If this signal is true (yes), then next is character only state COL 58. If this signal is false (no), then next is character and font cycle CFL 74.

State 1 is the character only load state, referring to character only mode. In this state, characters and not fonts are fetched. In state 1, the determination is then made at block 60 whether that state has been completed i.e. is msmdnb equal to zero. If the state is not completed, one returns to state 1. If state 1 has been completed, next is decision block 62 at which it is determined if the value of vonec is equal to 0. This vonec function as described above is for determining whether there are one or two cycles per memory cycle indicator. If no, then one proceeds to state 2 at block 64.

State 2 is the COH block meaning character only high. One then determines whether state 2 has been completed or not at decision point 66, and if not one returns to state 2. If yes, next is block 72 at which it is determined whether text mode memory request (vfrqb) is equal to zero or not. If yes, then one returns to state 1 and if no then one proceeds on to the load n (qldn) command after block 72, which loads the parameter value.

Next, state 3 is entered; this is the character and font load block 74. State 3 is cycled through at decision block 76 determining whether state 3 has been completed or not. If no, one cycles back to state 3 and if yes one proceeds on to decision block 78 at which 1 or 2 state cycles (vonec) being zero is determined.

If vonec is equal to zero, then one proceeds to state 7 at block 80 and which is character and font high. One cycles through state 7 at decision block 82, so that if the state 7 is not completed one returns to state 7, and if state 7 has been completed one proceeds onto vfrqb decision block 84. vfrqb is the determination of whether there has been a request for the text mode memory access. If the vfrqb value is 0, i.e. decision block 88 yields the no answer, one returns to state 3. If the answer is yes, one then proceeds on to the loop immediately below state 11.

Returning back to text mode memory request being zero (vfrqb) block 52 in the upper central portion of FIG. 3, if the answer to this is no, one proceeds to graphics mode memory request (vvrqb) equals zero at decision block 90. If the answer to this value being 0 is yes, i.e. graphics mode has been requested, then one proceeds along the yes path to qldn command 92, i.e. load n.

The next state is state 9 which is the VGA (graphics) low mode at block 96. One cycles through state 9 determining whether it is done or not at decision block 98. If the decision is that state 9 has been completed, one proceeds to 1 or 2 state cycles (vonec) block 100.

If the answer at VONEC block 100 is no, one then proceeds to state 11 which is VGA high block 104. One then cycles through block 104 at decision point 106 until state 11 is completed. When state 11 is completed, one proceeds to decision block 108 at which it is determined what is the value of vvrqb, meaning the graphics mode memory access being requested.

If the graphics mode is being requested one then returns up to state 9, and if it is not being requested one then returns along the no path from block 108 back up to the no decision path from block 90. As can be seen, the "no" decision path from block 90 leads to four concatenated decision blocks 110, 112, 114 and 116. Essentially these determine what is the current memory request mode including memory refresh, cursor fetch, CPU cycle and GE cycle, and in response enter the appropriate state. That is, decision block 110 determines the value of vrfrqb which is the memory refresh mode. If the answer is no, control is transferred to block 112.

If the answer at block 110 is yes, control is transferred to state 12 at block 118 which is the refresh cycle. One then cycles through the refresh cycle which is ended by determination of the value of mrtdnb at block 120 to determine whether this state is completed or not. If the state is completed, then one enters the end process designated by the zero at block 122.

The end process at block 122 indicates the end of the state machine process, upon which control is transferred to state 0 which is the idle state. Returning to block 110, if the answer to this is no, then control is transferred to block 112 which determines the value of vcrqb which refers to cursor request. If the answer at block 112 is yes, then control is transferred to qldm at step 126 which indicates load m. Then one enters state 10 which is the cursor low state at block 128.

One then cycles through state 10 at block 130 until state 10 is completed, and upon completion of state 10 one enters decision block 132 which is 1 or 2 state cycles (vonec). If the answer at vonec block 132 is yes, one proceeds to vcrqb decision block 136 to determine cursor request. If vcrqb is equal to zero then this is the end point at block 138, and if not control is returned to state 10.

If the answer at vonec block 132 is no, state 14 (cursor high) is entered at block 139 and state 14 is repeated at state completed (msmdn) block 141 until completed, with control then returned to block 136.

Returning to decision block 112, if the answer is no control is transferred to decision block vbrqb 114 determining whether the CPU bus has requested a memory access.

If the answer is yes, the system then enters state 4 (after executing the load m qldm command) at block 142 which is CPU bus request low. In state 4 it is determined at block 144 what is a value of state completed (msmdnb) and if no, control is transferred to block 146. If yes, at block 144, control goes to block 149.

If the value at block 146 is equal to zero, then control is transferred to block 150 (which is state 5) and designated as CPU bus request high. In state 5 one determines whether this state has been completed or not by determining the value of msmdnb at block 152. If the answer is no at block 152, then one returns to state 5 and if yes, control is transferred to block 154 at which it is determined if m equals zero. Block 154 is also reached from state 4 via block 144 and block 156 by determining the value of state completed (msmdnb).

At block 154 if the value of m is not equal to zero, then control is transferred to state 4. If yes, then control is transferred to block 156. If at block 156 the determination is yes, control is transferred to state 1 at block 58; if no, control is transferred to decision block 158. At block 158, if the determination is yes, control transfers to state 9 at block 96; if no, the end of the state machine is reached at state 0 at block 100.

The final portion of the state diagram begins with the decision block 116 which determines the value of gmrqb (whether there has been a graphics engine memory request) and which receives transfer of control from block 114). At block 116 if there is no graphics engine memory request, control is transferred (after executing command qldm) to block 50 which is state 0 (end of execution).

If there has been such a request, then control is transferred to state 8 after first executing the load m command at block 170. State 8 (which is block 172) is the graphics engine 0 state. The determination is made if state 8 has been terminated at state completed (msmdnb) block 174. If state 8 has been terminated, then control is transferred to block 176 at which whether m is equal to 0 is determined. If m is equal to 0 then the end point is reached at block 178 and if m is not equal to 0 then control is transferred block to state 8.

Figure 4:
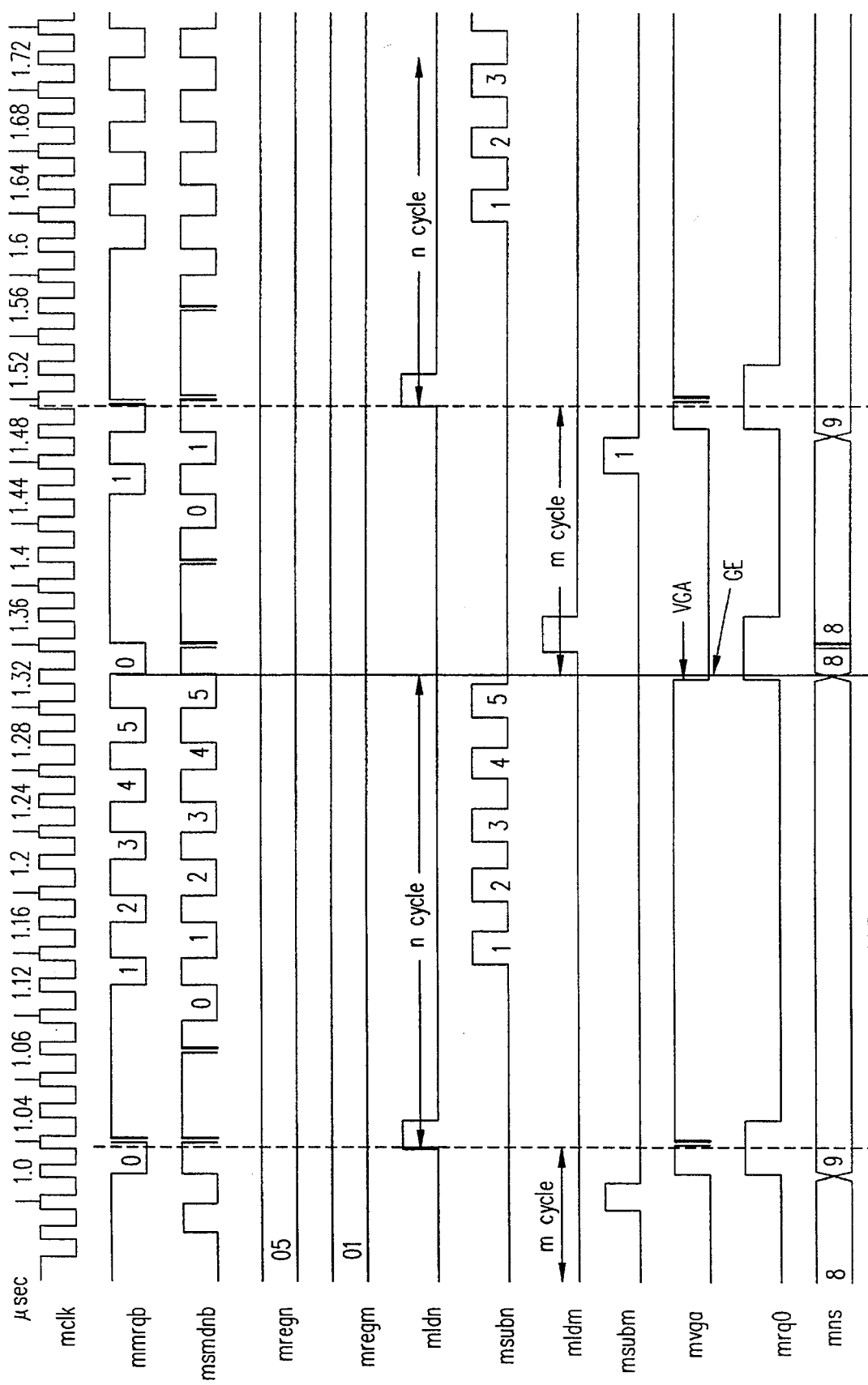
FIG. 4 shows timing diagrams for the memory controller of FIG. 2.

The states of FIG. 3 will be better understood with respect to the timing diagram of FIG. 4. The various signal designations for each of the waveforms shown in FIG. 4 relate to either functions described with regard to the state diagram of FIG. 3 or to the block diagram of FIG. 2.

The uppermost waveform in FIG. 4 is the mclk (memory clock) signal which in this example has approximately two pulses per 0.02 microsecond, i.e. a clock speed of approximately 50 MHz. The second line of FIG. 4 is the mrqb signal which is a memory request signal. (For purposes of clarity only one memory request signal of the many possible are shown in FIG. 4.) The vertical dotted line extending from the top to bottom of the left portion of FIG. 4 indicates the end of one cycle and the beginning of the next cycle. As shown, the beginning of this next cycle begins with the mmrqb signal going high, indicating state 0. This is therefore a memory request. This is followed by a series of memory requests labeled 1, 2, 3, 4 and 5. This portion of mmrqb indicates the n cycle. In this case, n equals 5 as indicated by the fourth line of FIG. 4 showing the register n value (mregn) as being equal to 5. The total number of display memory cycles is then n+1=6. Similarly, the sixth line of FIG. 4 indicates that the n register value (mregn) is 1. Therefore in this case n equals 5 and m equals 1. Hence the total number of CPU/GE cycles is m+1=2.

Each of the memory requests of the mmrqb signal triggers subsequently a corresponding pulse in the msmdnb signal line which indicates that the state is completed, i.e. the memory request is completed. The very narrow downwards going signals in the msmdnb signal are artifacts, i.e. glitches. Since the signals are level sensitive (not edge sensitive) such glitches are not detected. As shown, each of the memory request signals in the mmrqb signal of FIG. 4 triggers a subsequent corresponding "done" msmdnb signal indicating that that memory request has been completed, and labeled similarly 0, 1, 2, 3, 4 and 5. This activity is preceeded by the loading of the n value into the counter as shown in the sixth line which is the mldn signal. This loading occurs at the beginning of the n cycle. Then in the seventh line of FIG. 4, which is designated msubn, the value in the n counter is decremented five times indicated by the pulses 1, 2, 3, 4, 5, so that at each of these pulses the value of 1 is subtracted from the value in the n counter.

When the value in the n counter reaches 0, this is indicated by the eleventh line meq0 at which point a high pulse is generated in signal meg0 indicating the counter value is equal to 0. The n cycle is a VGA cycle (in contrast to the m cycle shown here which is a graphic engine cycle). Hence, the tenth line of FIG. 4 which is the mvga signal is high indicating the VGA cycle status during the duration of the n counting.

After the last of the five memory requests in the n cycle occurs and the counter is counted down to 0 as indicated by meq0 having a positive going pulse, this is the end of the n cycle and the state machine and counter switch to the m cycle (as indicated by the letter m) on the mmrqb line of FIG. 4. There are two m memory accesses taking place which are respectively numbered 0, 1 on the msmdnb line, since m has been assigned the value of 1. Therefore this is designated by the number 0 shown on the mmrqb line. Note that the eighth line of FIG. 4 (mldm) indicates the loading of m at the beginning of the m cycle. The subtracting of 1 from the value n in the msubm line of FIG. 4 is indicated by the number 1 shown on the second positive going pulse on that line. Therefore the m cycle is completed relatively quickly and the device switches back to the n cycle, as shown by the rightmost vertical dotted line in FIG. 4, which indicates the start of the next m cycle.

The final and twelfth line in FIG. 4 labelled mns indicates the state number, i.e. in this case the system is switching between states 8 and 9. State 8 is the graphics engine cycle and state 9 is the VGA low cycle.

Both the state machine of FIG. 3 and the timing diagrams of FIG. 4 are explained at an additional level of detail by the computer program of FIGS. 5a–5l. This computer program is in the VHDL circuit simulation language commercially available from Viewlogic Company, as rev. V4.0a. VHDL is a well-known system for simulation and design of logic circuitry including state machines. There are well-known commercially available synthesizer programs (such as one commercially available from EXEMPLAR Company, and called "VHDL Designers") which perform an automatic one-to-one translation of the computer code of FIGS. 5a–5l into circuitry, including elements such as flip-flops, registers, and logic gates. Thus the computer code of FIGS. 5a–5l is provided here as a detailed description of the actual circuitry, and such actual circuitry has a one-to-one correspondence to the computer code shown. In one embodiment, the circuitry of FIGS. 5a–5l is fabricated in an application specific integrated circuit (ASIC) standard cell chip, but of course other versions of said circuitry may be made as is well understood by one skilled in the art.

FIGS. 5a–5l are divided into two portions. FIGS. 5a and 5b describe the counter 30 of FIG. 2. FIGS. 5c to 5l describe the memory state machine 32 of FIG. 2. The variables named in FIGS. 5a to 5l are those used in the state diagram of FIG. 3, and FIGS. 5a to 5l include additional detail not shown for simplicity in the state diagram of FIG. 3.

Beginning with the model of the counter 30 shown in FIGS. 5a and 5b, the statement which begins with the word "port" identifies the various signal inputs and outputs to the counter including the m clock signal, the reset which is mrstb, the subtract m signal which is msubm, the subtract n signal which is msubn, and the load m and load n signals which are respectively mldm, and mldn. The remaining signals for the ports are set up signals. Also described are the various signals as shown in FIG. 2 which are mregn and mregm indicating the loading of the registers with the values n and m. As shown in the adjacent righthand portions of FIG. 5a, these are respectively 8 bit and 5 bit signals. Also shown is signal mountz which is identical to meq0 of FIG. 2.

The next portion of FIG. 5a labelled "architecture behavior of MC is" defines various internal signals, i.e. temporary variables, where the colon symbol (":") indicates a definition.

The following portion labelled "begin" is the beginning of the actual code. Note that the suffix "b" for a variable indicates an inverse logic value. The remaining code on FIG. 5a is a chain of "if" statements in which only one is performed in order of priority, to assign a value to the above-defined variable mcin. Note that the symbol "←" indicates a substitution of the right hand variable value into the variable on the left hand portion of the statement. The last line of FIG. 5a substituting a value for mbrw is in order to detect when the counter value is 0 using a borrow bit feature. The mbrw variable is defined as the borrow bit which is the highest, i.e. eighth bit, in the loadable counter.

In FIG. 5b the statements under the label "output signals" indicate (for the loadable counter) the output signals for the various types of memory request as defined above with respect to the state diagram of FIG. 3.

The next portion of FIG. 5b is labelled "fdbk" meaning feedback. This feedback process is for clocking the counter in the statement "wait until mclk='1'". The final line of the feedback process provides values in the counter registers mregm and mregm. The final portion of FIG. 5b provides the counter output meqo (from the variable mbrwz) as shown in FIG. 2.

FIGS. 5c–5l are a model of the memory state machine 32 of FIG. 2. Defined at the central portion of FIG. 5c are the ports for this memory state machine including the signals as shown in FIG. 2 plus additional signals as discussed above. Note that the final portion of the "interface declaration" of the central part of FIG. 5c defines signals subm, msubn, mldm, and mldn as output signals from the memory state machine, as shown in FIG. 2.

Figure 5D:
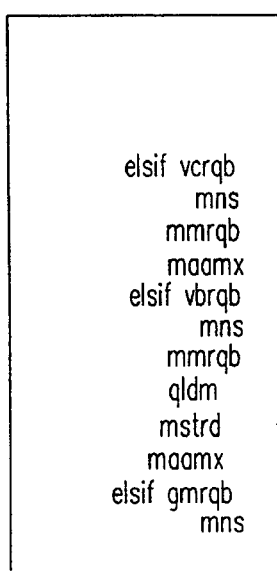

The lower portion of FIG. 5c defines the various states designated as s0, s1, . . . , to s15 at the top portion of FIG. 5d. Not all of the states are used in the state machine, as shown in FIG. 3.

The input process shown in the central portion of FIG. 5d defines several flip-flop circuits. Each flip-flop is clocked by mclk.

The iomux process at the lower portion of FIG. 5d defines for two functional blocks (the graphic engine and the VGA) that each of these functional blocks can request memory services, and the multiplexer detects which mode the memory controller is intended to be in, i.e. graphics engine mode or VGA mode. There are other submodes as defined herein.

The output process defined in the upper portion of FIG. 5e defines a process where the state machine outputs signals to other blocks of the memory controller (not to the counter) which are not described herein further.

The lower portion of FIG. 5e beginning with the statement "when 0→" begins the definition of the present state 0. State 0 begins with a string of "if" statements determining which type of memory request is currently underway, corresponding to blocks 52, 90, 110, 112, 114, 116 of FIG. 3. Note that "mns" refers to a next state.

Beginning in the upper portion of FIG. 5f is the code defining present state 1. This code includes the definition of vonec as described above. As can be seen in state 1, the function qsubn takes place which subtracts 1 from the n parameter counter value.

State 2 is defined in the central portion of FIG. 5f. The significance of state 2 is that it is paired with state 1 in the cases where two cycles are needed, i.e. each request must go to a different state. If vonec='0', then one needs to execute two memory accesses Therefore, two states are needed.

State 3 as shown in the lower portion of FIG. 5f is to be understood as described above.

The remaining states are further defined in FIGS. 5g, 5h, 5i, and 5j. State 8 in FIG. 5j is of interest because this was discussed above in conjunction with the timing diagram of FIG. 4. The operation of state 8 is such that if the graphics engine is completed with its memory access but the associated counter value is not equal to 0, then the state machine remains at state 8 and performs more memory cycles but decrements the m value by 1 each time. Otherwise, if m is equal to 0 state 8 is complete.

The "END CASE" shown in FIG. 5k is the end of the state machine states. At the end of the end case statement, there is an unconditional jump to state 0.

The above description of the invention is illustrative and not limiting; further embodiments will be apparent to one of ordinary skill in the art in light of this disclosure and the appended claims.

I claim:

1. An arbitration duty cycle method for controlling flow of data from a data source to at least first and second data requesters, the data source providing the data in cycles, each cycle having a particular duration, comprising the steps of:

establishing first and second programmable parameters associated respectively with the first and second data requesters;

allowing the data to flow from the data source to the first data requester only for a number of the cycles determined by the first programmable parameter;

then subsequently allowing the data to flow from the source to the second data requester for a number of the cycles determined by the second programmable parameter;

changing at least one of the first and second programmable parameters so that a memory associated with at least one of the data requesters is never empty; and wherein the flow of data is devoted to each of the first and second requesters in a duty cycle pattern in accordance with respectively the first and second programmable parameters.

2. The method of claim 1, wherein the data source is a single port random access memory.

3. The method of claim 1, wherein the first and second requesters accept the flow of data at differing rates.

4. The method of claim 1, wherein the first and second requesters operate asynchronously to one another.

5. The method of claim 1, further comprising the steps of:

storing the first and second programmable parameters each in one of two programmable registers.

6. The method of claim 1, wherein the first data requester includes a single port memory, and further comprising the steps of:

determining if the single port memory is full of data; and when the single port memory is determined to be full, directing the flow of data to the second data requester.

7. The method of claim 5, further comprising the steps of:

loading one of the first and second programmable parameters from one of the two programmable registers into a counter, the loaded programmable parameter thereby becoming a counter value;

decrementing the counter value at each cycle that the data flows to a data requester associated with the loaded one of the first and second programmable parameters; and when the counter value equals zero, loading the other one of the first and second programmable parameters into the counter.

8. The method of claim 1, wherein a number of cycles determined by each of the first and second programmable parameters is equal to one more than the first and second programmable parameters.

9. A memory arbitration duty cycle controller for a system having a memory and at least two data requesters connected by a bus to the memory, comprising:

a loadable counter for holding a programmable parameter value, there being a programmable parameter value associated with each of the two data requesters;

a memory state machine for loading a programmable parameter value associated with one of the two data requesters into the loadable counter, and decrementing the programmable parameter value in the loadable counter each cycle that a data requester associated with the loaded programmable parameter value accepts data from the memory;

means for changing at least one of the programmable parameter values so that a memory associated with at least one of the data requesters is never empty; and, wherein the memory state machine loads into the loadable counter another of the programmable parameter values when the programmable parameter value in the loadable counter is decremented to zero, and wherein each data requester accepts data from the memory in a duty cycle pattern, a flow of data being devoted to each data requester by the duty cycle pattern in accordance respectively with the programmable parameter values.

10. The controller of claim 9, wherein the memory state machine further comprises:

means for determining if a first of the two data requesters can accept no more data, and in response thereto, directing data from the memory to the second of the two data requesters.

* * * * *